United States Patent
Huff et al.

(10) Patent No.: US 11,759,845 B2
(45) Date of Patent: Sep. 19, 2023

(54) NET SHAPED SUBSTRATE MATERIAL FOR SUBSTRATE JOINT

(71) Applicant: Ford Global Technologies, LLC, Dearborn, MI (US)

(72) Inventors: Garret Sankey Huff, Ann Arbor, MI (US); Amanda Kay Freis, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 23 days.

(21) Appl. No.: 17/352,638

(22) Filed: Jun. 21, 2021

(65) Prior Publication Data

US 2021/0308742 A1 Oct. 7, 2021

Related U.S. Application Data

(63) Continuation of application No. 15/726,172, filed on Oct. 5, 2017, now abandoned.

(51) Int. Cl.
| | |
|---|---|
| *B21J 15/02* | (2006.01) |
| *B21J 15/14* | (2006.01) |
| *B21C 23/14* | (2006.01) |
| *B32B 7/05* | (2019.01) |
| *B32B 15/04* | (2006.01) |
| *B32B 15/20* | (2006.01) |
| *B32B 9/04* | (2006.01) |
| *B32B 5/24* | (2006.01) |
| *B32B 7/08* | (2019.01) |
| *B29L 31/30* | (2006.01) |
| *B29C 65/00* | (2006.01) |
| *B29C 65/64* | (2006.01) |

(52) U.S. Cl.
CPC .......... *B21J 15/025* (2013.01); *B21C 23/142* (2013.01); *B21J 15/147* (2013.01); *B32B 5/24* (2013.01); *B32B 7/05* (2019.01); *B32B 7/08* (2013.01); *B32B 9/041* (2013.01); *B32B 15/04* (2013.01); *B32B 15/20* (2013.01); *B29C 65/64* (2013.01); *B29C 66/742* (2013.01); *B29L 2031/3002* (2013.01); *B32B 2250/02* (2013.01); *Y10T 428/24322* (2015.01)

(58) Field of Classification Search
CPC .. B32B 7/05; B32B 7/08; B32B 15/04; B32B 15/20; B32B 2250/02; Y10T 428/24322
See application file for complete search history.

(56) References Cited

U.S. PATENT DOCUMENTS

| | | | | |
|---|---|---|---|---|
| 5,884,386 | A | * 3/1999 | Blacket | B21J 15/025 29/522.1 |
| 2014/0234574 | A1 | * 8/2014 | Campbell | B32B 15/08 156/92 |
| 2017/0044637 | A1 | * 2/2017 | Campbell | C21D 1/40 |
| 2018/0214933 | A1 | * 8/2018 | Potocki | F16B 19/086 |

* cited by examiner

*Primary Examiner* — David Sample
*Assistant Examiner* — Donald M Flores, Jr.
(74) *Attorney, Agent, or Firm* — Burris Law, PLLC

(57) ABSTRACT

An assembly includes an upper substrate, a lower substrate, and a self-piercing rivet. The lower substrate defines a preformed interior cavity and a preformed exterior profile adjacent the interior cavity to define a variable thickness wall. The self-piercing rivet extends through the upper substrate and into the preformed interior cavity of the lower substrate.

13 Claims, 4 Drawing Sheets

NET SHAPED SUBSTRATE MATERIAL FOR SUBSTRATE JOINT

CROSS-REFERENCE TO RELATED APPLICATION

This application is a continuation of and claims the benefit of U.S. application Ser. No. 15/726,172, filed Oct. 5, 2017, and titled "NET SHAPED SUBSTRATE MATERIAL FOR SUBSTRATE JOINT," the content of which is incorporated herein by reference in its entirety.

FIELD

The present disclosure relates to the joining of various materials in an assembly, including dissimilar materials having advanced high strength and light weight.

BACKGROUND

The statements in this section merely provide background information related to the present disclosure and may not constitute prior art.

As the automotive industry continues to focus on reducing the weight of vehicles to meet customer expectations on fuel economy and Corporate Average Fuel Economy (CAFE) requirements, interest in alternative materials including carbon fiber composite applications has increased. In body-in-white structures, joining methods have traditionally relied on resistance-spot welding (e.g., in steel structures).

In the case of aluminum intensive vehicles and other mixed metal joining applications, self-piercing rivet technology prevails. One advantage of self-piercing rivet technology is that it is a high production volume assembly process. Self-piercing rivet technology is compatible with adhesive and both methods can be used together. The challenge often faced with self-piercing rivet technology, however, is that the substrate material must be ductile enough to form a "button", i.e., protrusion, which is the result of creating the joint and the necessary deformation to provide mechanical interlock. When composite parts do not have sufficient ductility to form a button on the obverse side, fibers may be exposed through cracks in this surface. Surface cracking and fiber displacement are undesirable, as they may reduce the durability of the joint and result in premature failure. With a self-piercing rivet, fibers in the area where the rivet is inserted may result in surface cracking or fiber displacement.

Composite materials, such as carbon fiber, glass fiber or natural fiber composites, can be limited in application due to challenges relating to joining parts together. Frequently, these composites have limited ductility and are not well adapted to large displacements and deformation required to join parts together with self-piercing rivets. Other non-composite materials having higher strength and light weight are also often brittle and challenging to join using self-piercing rivet (SPR) technology.

The joining of advanced high strength and lightweight materials, among other assembly issues, is addressed by the present disclosure.

SUMMARY

In one form, an assembly is provided, which includes an upper substrate, a lower substrate, and a self-piercing rivet. The lower substrate defines a preformed interior cavity and a preformed exterior profile adjacent the interior cavity to define a variable thickness wall. The self-piercing rivet extends through the upper substrate and into the preformed interior cavity of the lower substrate. The preformed interior cavity of the lower substrate may or may not be plastically deformed after installation of the self-piercing rivet.

In one form, the lower substrate is an aluminum casting or an aluminum extrusion. In another form, the lower substrate is a composite material. The preformed interior cavity in one form defines a circular trench having a raised central region, and in another form, the preformed exterior profile defines a closed cylinder. The preformed exterior profile may further define a radiused area extending between a lower surface of the lower substrate and the cylinder. Generally, the preformed interior cavity is configured to direct flaring of the self-piercing rivet.

In another form, a dimpled substrate for use in an assembly having joined substrates is provided. The dimpled substrate defines at least one preformed interior cavity and at least one preformed exterior profile adjacent the interior cavity to define a variable thickness wall. The preformed interior cavity is configured to receive a fastening system that plastically deforms at least one of the substrates during joining.

In still another form, an assembly is provided, which includes an upper substrate, a lower substrate, and a plurality of self-piercing rivets. The lower substrate defines a plurality of preformed interior cavities and a corresponding plurality of preformed exterior profiles adjacent the interior cavities to define variable thickness walls therebetween. The plurality of self-piercing rivets extend through the upper substrate and into the preformed interior cavities of the lower substrate. The preformed interior cavities are configured to direct flaring of the self-piercing rivets.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

Corresponding reference numerals indicate corresponding parts throughout the several views of the drawings.

DETAILED DESCRIPTION

The following description is merely exemplary in nature and is not intended to limit the present disclosure, application, or uses.

Figure 1:
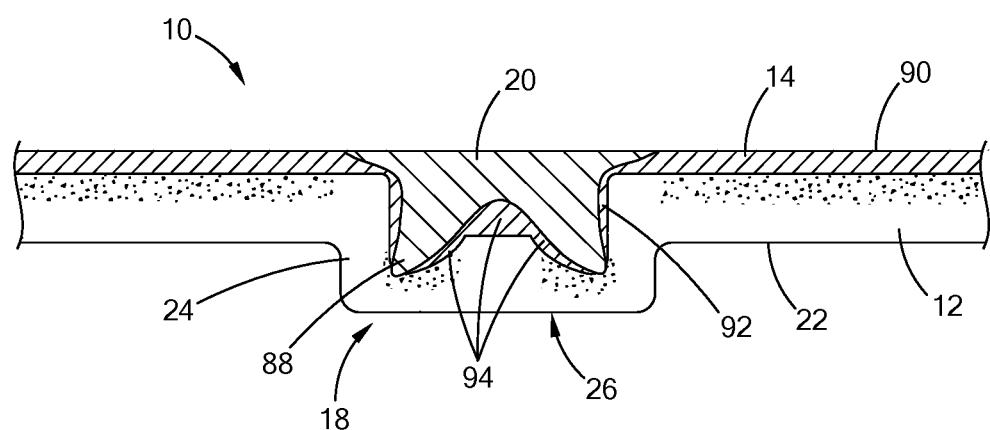
FIG. 1 is a cross-sectional view of a joined assembly constructed in accordance with the teachings of the present disclosure.

Referring to FIG. 1, a joined composite or assembly 10 includes a lower substrate 12, an upper substrate 14, and at least one self-piercing rivet 20 that secures the lower substrate 12 to the upper substrate 14. While only one self-piercing rivet 20 is shown, the joined composite or assembly 10 may include a plurality of self-piercing rivets 20 spaced across the surface of the joined composite or assembly 10. The lower substrate 12 may be a dimpled substrate and includes at least one preformed exterior profile in the form of a button shaped protrusion or "button" 18. The button 18 extends downwardly from a lower surface 22 of the lower substrate 12 and is disposed in a predetermined location where a corresponding self-piercing rivet 20 is planned to be inserted into the lower substrate 12. The upper substrate 14 may be made of steel, aluminum, a fiber reinforced composite material, or other materials. The lower substrate 12 may be a cast part, a molded part, or a 3D-printed part, among others. In various forms of the present disclosure, the substrate 12 is an aluminum casting, an aluminum extrusion, or a composite material.

Figure 2:
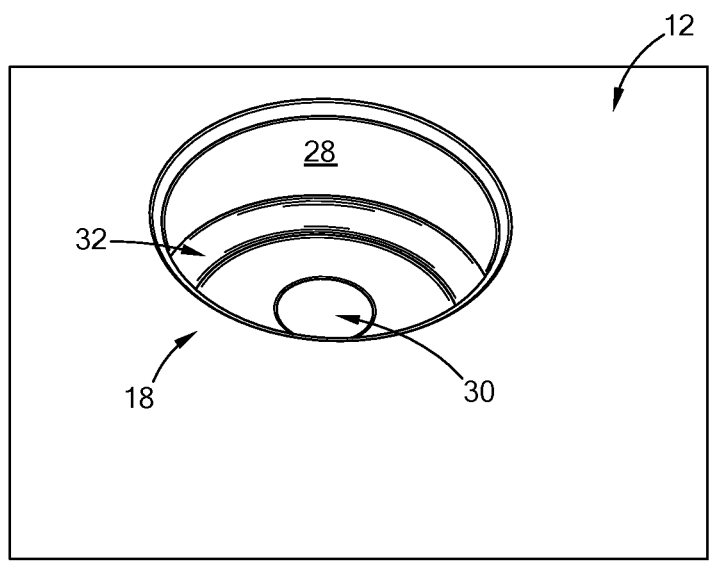
FIG. 2 is a top perspective view of a lower substrate of the joined assembly of FIG. 1 having a preformed interior cavity according to the teachings of the present disclosure.
Figure 3:
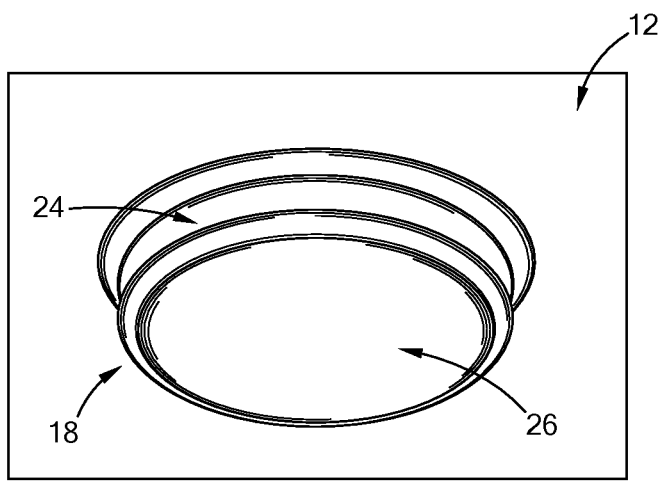
FIG. 3 is a bottom perspective view of the lower substrate of FIG. 2.

Referring to FIGS. 2 and 3, the button 18 of the lower substrate 12 is configured to be a closed cylinder which has a peripheral wall 24 and a bottom wall 26. The peripheral wall 24 and the bottom wall 26 jointly define a preformed exterior profile having a preformed interior cavity 28. The preformed interior cavity 28 is configured to receive a fastening system, such as the self-piercing rivet 20, which plastically deforms at least one of the lower and upper substrates 12, 14 during joining.

Figure 4:
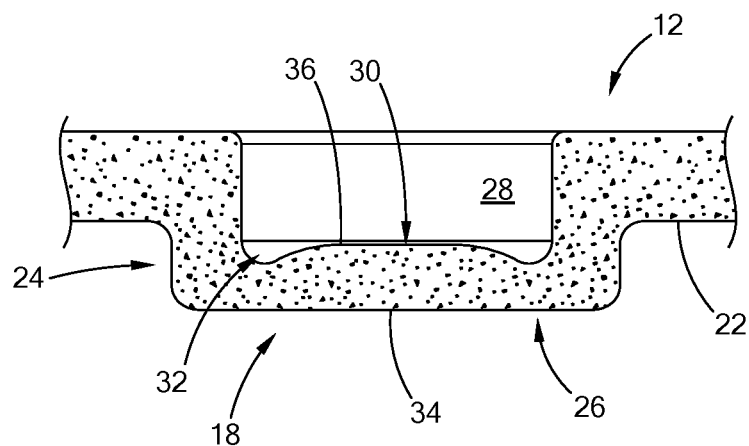
FIG. 4 is a cross-sectional view of the lower substrate of FIG. 2.

Referring to FIG. 4, the bottom wall 26 has a variable thickness and has the largest thickness adjacent a central region, thereby defining a raised central region 30. A circular or annular trench 32 is defined between the raised central region 30 and the sidewall 24 of the button 18 and surrounds the raised central region 30. The button 18 has a substantially flat bottom surface 34 in one form of the present disclosure. The raised central region 30 has a top surface 36 that is lower than a lower surface 22 of the lower substrate 12.

Figure 5:
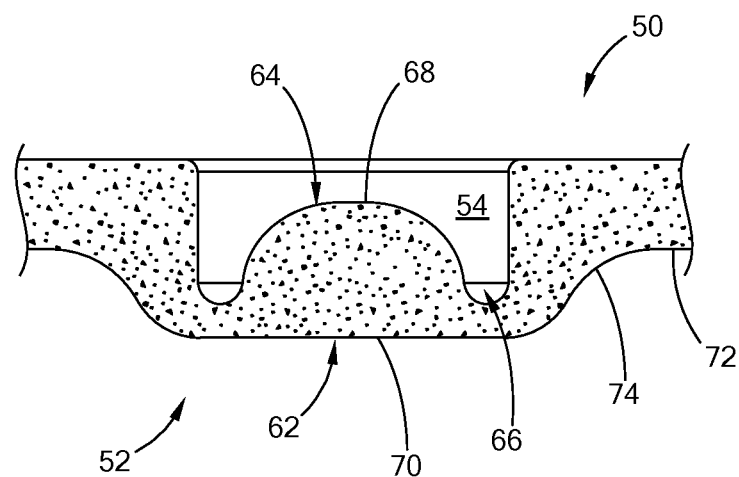
FIG. 5 is a cross-sectional view of a variant of a lower substrate of a joined assembly constructed in accordance with the teachings of the present disclosure.

Referring to FIG. 5, a lower substrate 50 in accordance with a variant of the present disclosure is structurally similar to the lower substrate 12 of FIGS. 1 to 4 except for the configuration of the button. More specifically, the lower substrate 50 includes a button 52 defining a preformed internal cavity 54 and includes a bottom wall 62. The bottom wall 62 has a variable thickness and has the largest thickness adjacent a central region, thereby defining a raised central region 64. An annular or circular trench 66 is defined inside the preformed internal cavity 54 and surrounds the raised central region 64. The raised central region 64 defines a top surface 68 raised to a height above the lower surface 72 of the lower substrate 50. The bottom surface 70 of bottom wall 70 of the button 52 is substantially flat. The button 52 further includes a radiused area 74 that joins the bottom surface 70 of the bottom wall 70 to the lower surface 72 the lower substrate 50 where no button is formed.

Figure 6:
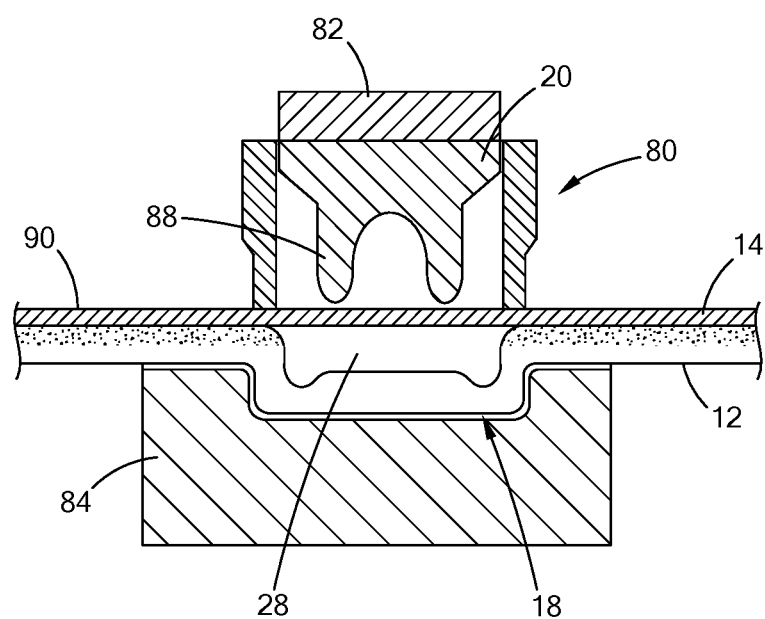
FIG. 6 is a cross-sectional view of an upper substrate and a lower substrate with a self-piercing rivet tool including a riveter punch and a back-up die with a self-piercing rivet in position to be driven into the upper and lower substrates.

Referring to FIG. 6, to join the lower substrate 12 to the upper substrate 14, the upper substrate 14 is placed over the lower substrate 12 in a self-piercing rivet tool 80. The self-piercing rivet tool 80 includes a riveter punch 82 and a back-up die 84. The preformed interior cavity 28 of the button 18 of the lower substrate 12 is closed by the upper substrate 14.

The self-piercing rivet 20 is placed inside the self-piercing rivet tool 80 and immediately above the preformed interior cavity 28 of the lower substrate 12. The self-piercing rivet 20 has an insertion end 88 to pierce through the upper substrate 14 and to be inserted into the preformed interior cavity 28 of the lower substrate 12 to engage the bottom wall 26 of the button 18. It should be understood that the reference to a top side is not limiting and that the lower and the upper substrates 12, 14 may be arranged in any orientation.

Referring back to FIG. 1, when the self-piercing rivet 20 is completely inserted into the joined composite or assembly 10, the insertion end 88 of the self-piercing rivet 20 is spread apart as the self-piercing rivet 20 is driven through the upper substrate 14. The preformed interior cavity 28 is configured to direct flaring of the self-piercing rivet 20. A portion of the upper substrate 14 adjacent the self-piercing rivet 20 is plastically deformed. Material from the upper substrate 14 may be deformed and directed into the preformed interior cavity 28 to fill the preformed interior cavity 28. Radially displaced material 92 fills in between the side of the self-piercing rivet 20 and the button 18. Axially displaced material 94 fills in between the insertion end 88 of the self-piercing rivet 20 and the bottom wall 26 of the button 18 of the lower substrate 12.

The self-piercing rivet 20 penetrates the lower substrate 12 to create a mechanical interlock, thereby joining the lower substrate 12 and the upper substrate 14 together. The preformed interior cavity 28 of the lower substrate 12 may or may not be plastically deformed after installation of the self-piercing rivet 20. The preformed button 18 and the preformed internal cavity 28 receive the displaced material 92, 94 and reduce the force exerted on the lower substrate 12 in the area of the preformed button 18. By preforming the button 18, any tendency for the button 18 to crack or split is substantially reduced.

With the lower substrate 12 having a preformed exterior profile, the lower substrate 12 may be made of a brittle material. Therefore, a brittle material or a low-strain material may be easily joined to another material by a self-piercing rivet.

The joined composite or assembly 10 constructed in accordance with the teachings of the present application may be used to form vehicle body and closure parts in automobiles or in any applications which require joining of two or more layers of materials.

It should be noted that the disclosure is not limited to the embodiment described and illustrated as examples. A large variety of modifications have been described and more are part of the knowledge of the person skilled in the art. These and further modifications as well as any replacement by technical equivalents may be added to the description and figures, without leaving the scope of the protection of the disclosure and of the present patent.

What is claimed is:

1. An assembly comprising:
    a first substrate;
    a second substrate, a front side of the second substrate facing the first substrate and defining a preformed interior cavity, a rear side of the second substrate being opposite the front side of the second substrate and defining a preformed exterior profile that cooperates with the interior cavity to define a variable thickness wall, wherein the preformed interior cavity defines a circular trench and a raised central region such that, before and after installation of the self-piercing rivet, the variable thickness wall has a greater thickness in the raised central region than in the circular trench; and
    a self-piercing rivet extending through the first substrate and into the preformed interior cavity of the second substrate, wherein the preformed interior cavity is configured to receive material from the first substrate during installation of the self-piercing rivet and the variable thickness wall is configured to direct flaring of the self-piercing rivet.

2. The assembly according to claim 1, wherein the preformed interior cavity of the second substrate is plastically deformed during installation of the self-piercing rivet.

3. The assembly according to claim 1, wherein the second substrate is an aluminum casting or an aluminum extrusion such that the preformed interior cavity and preformed exterior profile are formed by a corresponding casting or extrusion process.

4. The assembly according to claim 1, wherein the second substrate is a composite material.

5. The assembly according to claim 1, wherein the preformed exterior profile defines a closed cylinder.

6. The assembly according to claim 5, wherein the preformed exterior profile further defines a radiused area extending between a rear surface of the second substrate and the cylinder.

7. The assembly according to claim 1, wherein the preformed exterior profile includes a bottom wall that is substantially flat in a region that is aligned with the raised central region.

8. An assembly comprising:
a first substrate;
a second substrate, a front side of the second substrate defining a plurality of preformed interior cavities and a back side of the second substrate defining a corresponding plurality of preformed exterior profiles that cooperate with the interior cavities to define variable thickness walls therebetween, wherein each preformed interior cavity defines a circular trench and a raised central region such that, before and after installation of the self-piercing rivets, each variable thickness wall has a greater thickness in the raised central region than in the circular trench; and
a plurality of self-piercing rivets extending through the first substrate and into the preformed interior cavities of the second substrate, wherein the preformed interior cavities and variable thickness walls are configured to direct flaring of the self-piercing rivets.

9. The assembly according to claim 8, wherein the second substrate is an aluminum casting or an aluminum extrusion.

10. The assembly according to claim 8, wherein the second substrate is a composite material.

11. The assembly according to claim 8, wherein preformed exterior profiles define closed cylinders.

12. A motor vehicle having the assembly according to claim 8.

13. The assembly according to claim 8, wherein the preformed exterior profile includes a bottom wall that is substantially flat in a region that is aligned with the raised central region.

* * * * *